United States Patent
Qu (10) Patent No.: US 9,886,114 B2
(45) Date of Patent: Feb. 6, 2018

(54) TOUCH PANEL AND DISPLAY DEVICE

(71) Applicants: BOE TECHNOLOGY GROUP CO., LTD., Beijing (CN); BEIJING BOE OPTOELECTRONICS TECHNOLOGY CO., LTD., Beijing (CN)

(72) Inventor: Lianjie Qu, Beijing (CN)

(73) Assignees: BOE TECHNOLOGY GROUP CO., LTD., Beijing (CN); BEIJING BOE OPTOELECTRONICS TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 15/325,181

(22) PCT Filed: Feb. 24, 2016

(86) PCT No.: PCT/CN2016/074411
§ 371 (c)(1),
(2) Date: Jan. 10, 2017

(87) PCT Pub. No.: WO2016/141806
PCT Pub. Date: Sep. 15, 2016

(65) Prior Publication Data
US 2017/0185202 A1    Jun. 29, 2017

(30) Foreign Application Priority Data
Mar. 11, 2015    (CN) .......................... 2015 1 0106622

(51) Int. Cl.
G06F 3/045    (2006.01)
G06F 3/041    (2006.01)
(Continued)

(52) U.S. Cl.
CPC ........ G06F 3/0412 (2013.01); G02F 1/13338 (2013.01); G02F 1/133512 (2013.01);
(Continued)

(58) Field of Classification Search
None
See application file for complete search history.

(56) References Cited

U.S. PATENT DOCUMENTS

9,151,790 B1 * 10/2015 Hoshtanar .......... G01R 27/2605
9,619,063 B2    4/2017 Wei et al.
(Continued)

FOREIGN PATENT DOCUMENTS

CN    101312014 A    11/2008
CN    103472966 A    12/2013
(Continued)

OTHER PUBLICATIONS

International Search Report dated May 30, 2016 issued in corresponding International Application No. PCT/CN2016/074411 along with an English translation of the Written Opinion of the International Searching Authority.
(Continued)

*Primary Examiner* — Christopher R Lamb
(74) *Attorney, Agent, or Firm* — Nath, Goldberg & Meyer; Joshua B. Goldberg (57) ABSTRACT

The present invention provides a touch panel and a display device. The touch panel comprises a plurality of touch sensing electrodes and a plurality of touch driving electrodes, wherein the touch sensing electrodes and the touch driving electrodes are arranged along different directions on different planes, with an insulating layer provided where the two cross over; and a plurality of dummy electrodes are formed on a plane where the touch sensing electrodes and/or the touch driving electrodes are located, so that electrodes on
(Continued)

a same plane are distributed uniformly. The touch panel provided by the present invention can improve uniformity of a display frame, thereby improving a quality of the display frame of the display device.

7 Claims, 6 Drawing Sheets

(51) Int. Cl.
*G06F 3/044* (2006.01)
*G02F 1/1333* (2006.01)
*G02F 1/1335* (2006.01)
*G02F 1/1343* (2006.01)

(52) U.S. Cl.
CPC .. *G02F 1/133514* (2013.01); *G02F 1/134309* (2013.01); *G06F 3/044* (2013.01); *G06F 2203/04111* (2013.01)

(56) References Cited

U.S. PATENT DOCUMENTS

2010/0163394 A1* 7/2010 Tang ..................... G06F 3/0416
200/600
2011/0273401 A1* 11/2011 Moriwaki ........... G02F 1/13338
345/174
2012/0044202 A1* 2/2012 Ishizaki .............. G02F 1/13338
345/174
2014/0292710 A1 10/2014 Koito et al.
2015/0212613 A1* 7/2015 Fowlkes ................. G06F 3/046
345/173
2015/0317023 A1 11/2015 Wei et al.

FOREIGN PATENT DOCUMENTS

| CN | 103500044 A | 1/2014 |
|---|---|---|
| CN | 103713792 A | 4/2014 |
| CN | 104076995 A | 10/2014 |
| CN | 104635992 A | 5/2015 |
| KR | 10-2012-0055367 A | 5/2012 |

OTHER PUBLICATIONS

Office Action dated Mar. 20, 2017 issued in corresponding Chinese Application No. 201510106622.7.

* cited by examiner

TOUCH PANEL AND DISPLAY DEVICE

This is a National Phase Application filed under 35 U.S.C. 371 as a national stage of PCT/CN2016/074411 filed on Feb. 24, 2016, an application claiming the benefit of Chinese Application No. 201510106622.7 filed on Mar. 11, 2015, the content of each of which is hereby incorporated by reference in its entirety.

TECHNICAL FIELD

The present invention belongs to the field of touch-control display technology, and in particular relates to a touch panel and a display device.

BACKGROUND

With the development of technology, touch-control display panels are increasingly applied to electronic products such as touch screen cell phones, tablet computers, or the like. A touch-control display panel not only has a display function, but also has a touch-control function. At present, a touch-control display panel is typically a built-in touch-control display panel, which refers to a touch-control display panel formed by providing touch-control units in a display panel, and has advantages of low cost, small thickness of the display panel and the like.

Figure 1:
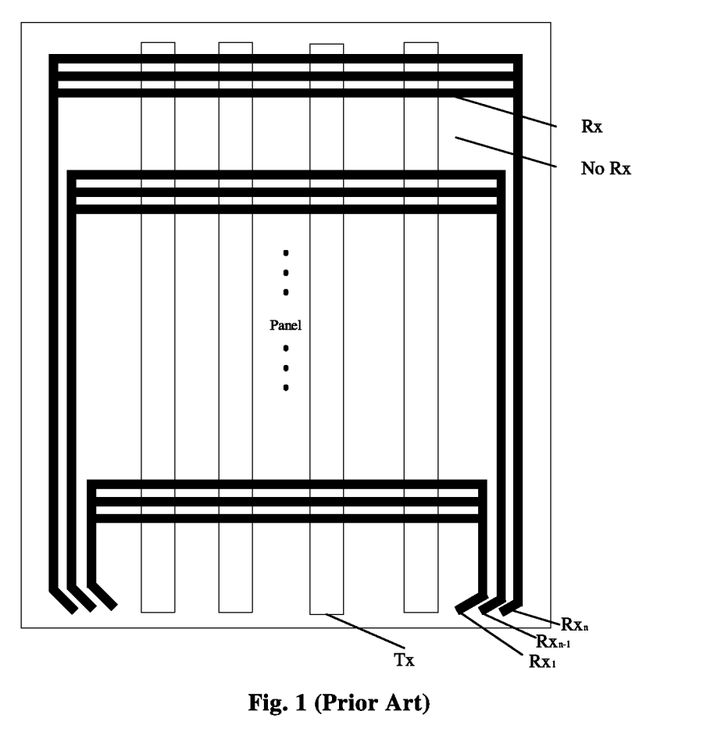
FIG. 1 is a schematic diagram of a structure of an existing touch-control display panel.
Figure 2:
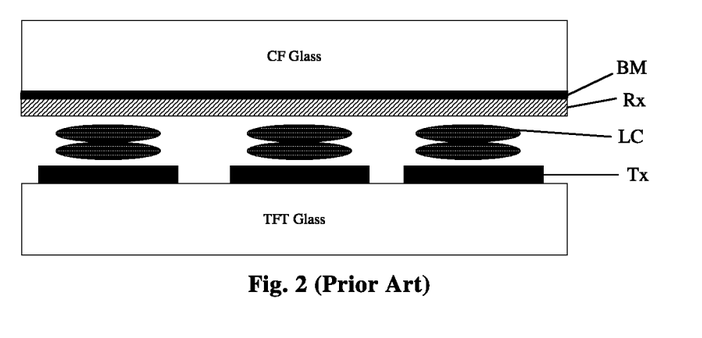
FIG. 2 is a cross-sectional view of the touch-control display panel illustrated in FIG. 1.

FIG. 1 is a schematic diagram of a structure of an existing touch-control display panel; FIG. 2 is a cross-sectional view of the touch-control display panel illustrated in FIG. 1. Referring to FIG. 1 together with FIG. 2, the touch-control display panel includes a color filter substrate CF Glass (hereinafter, simply referred to as "CF") and an array substrate TFT Glass (hereinafter, simply referred to as "TFT") which are staked from top to bottom, with liquid crystals LC filled between the color filter substrate CF and the array substrate TFT. A black matrix and a color filter (R, G and B) are provided on a lower surface of the color filter substrate CF, and a plurality of touch sensing electrodes Rx, which are parallel to each other and arranged along a horizontal direction, are provided under the black matrix. The plurality of touch sensing electrodes are spaced apart in a vertical direction and arranged non-uniformly, as shown in FIG. 1, such that there are regions with the touch sensing electrodes Rx and regions without the touch sensing electrodes Rx (NO Rx as shown in FIG. 1) on the color filter substrate CF. Each of the touch sensing electrodes Rx is led out by a peripheral wire. A plurality of touch driving electrodes Tx, which are parallel to each other and arranged along the vertical direction, are provided on the array substrate TFT. Since the touch driving electrode Tx and the touch sensing electrode Rx are arranged in directions perpendicular to each other, a capacitance is formed where they cross over. Because of the capacitance formed between the touch driving electrode Tx and the touch sensing electrode Rx, as long as a driving signal is supplied to the respective touch driving electrodes Tx in turn by way of scanning, a corresponding sensing signal may be generated on each touch sensing electrode Rx. When the display screen is touched, the above capacitance at the touch point would change, resulting in a change in the sensing signal. As such, a horizontal coordinate of the touch point can be determined according to the touch sensing electrode Rx with a changed sensing signal, and then a vertical coordinate of the touch point can be determined according to the touch driving electrode Tx currently being scanned, and finally an accurate poison of the touch point can be obtained according to the horizontal coordinate and the vertical coordinate, thus achieving touch control.

However, there are following inevitable problems found in practical applications employing the above touch-control display screen: the existence of the touch sensing electrodes Rx causes influence on diffuse reflections of optical signals; the non-uniform distribution of the touch sensing electrodes Rx causes influence on the quality of the display frame.

SUMMARY

The present invention is intended at least to solve one of the technical problems existing in the prior art, and provides a touch panel and a display device which can improve uniformity of a display frame, thereby improving a quality of the display frame.

In order to solve one of the problems described above, the present invention provides a touch panel, including a plurality of touch sensing electrodes and a plurality of touch driving electrodes, wherein the touch sensing electrodes and the touch driving electrodes are arranged along different directions on different planes, with an insulating layer provided where the touch sensing electrodes and the touch driving electrodes cross over; and a plurality of dummy electrodes are formed on a plane where the touch sensing electrodes and/or the touch driving electrodes are located, so that electrodes on a same plane are distributed uniformly.

Optionally, each of the dummy electrodes is one continuous electrode.

Optionally, each of the dummy electrodes is connected to the ground.

Optionally, one or more via holes are provided in each of the dummy electrodes, a grounded high resistance film layer is formed on an outer side of a plane on which the dummy electrodes are located, and each of the dummy electrodes is electrically connected to the high resistance film layer via the via holes.

Optionally, the one or more via holes are spaced apart uniformly from each other along a length direction of the dummy electrodes.

Optionally, each of the dummy electrodes comprises a plurality of dummy sub-electrodes spaced apart from each other.

Optionally, each of the dummy electrodes comprises a plurality of dummy sub-electrodes spaced apart from each other and arranged uniformly.

Optionally, each of the dummy sub-electrodes crosses over only one of the touch driving electrodes.

Optionally, each of the dummy sub-electrodes is provided in a region between two adjacent touch driving electrodes, and does not cross over the touch driving electrodes.

Optionally, all of the dummy sub-electrodes are electrically connected and grounded using wires.

Optionally, a tip is formed at both ends of each dummy sub-electrode of each dummy electrode, and any two adjacent tips are in contact with each other.

Optionally, the plurality of the touch driving electrodes or the plurality of touch sensing electrodes are arranged in parallel to each other;

Optionally, each of the dummy electrodes is arranged in parallel to the touch sensing electrodes or the touch driving electrodes on the plane where the dummy electrode is located.

Optionally, the touch panel comprises a color filter substrate and an array substrate, wherein the touch sensing electrodes are provided on the color filter substrate, the touch driving electrodes are provided on the array substrate, and the dummy electrodes are provided on the plane on which the touch sensing electrodes are located.

Optionally, a black matrix is formed on an inner side of the color filter substrate, and the touch sensing electrodes and the dummy electrodes are formed on an inner side of the black matrix, the inner side being a side facing away from a display surface.

The present invention further provides a display device, comprising the touch panel described above.

The present invention has the following beneficial effects:

The touch panel provided by the present invention has a plurality of dummy electrodes additionally formed on a plane on which touch sensing electrodes and/or touch driving electrodes are located, so that the electrodes on a same plane are uniformly distributed. In virtue of the uniformly distributed electrodes, uniform diffuse reflections of optical signals on a same plane can be achieved, thereby eliminating a non-uniform display frame resulting from non-uniformly distributed electrodes;

The display device provided by the present invention, which employs the touch panel provided by the present invention, can improve uniformity of a display frame, thereby improving a quality of the display frame.

Reference Numerals: Rx, touch sensing electrode; Tx, touch driving electrode; CF, color filter substrate; BM, black matrix; TFT, array substrate; LC, liquid crystal; NO Rx, region without touch sensing electrode; DRx, dummy electrode; VH, via hole; 10, high resistance film layer; R, G and B, color filter; PS, spacer.

DETAILED DESCRIPTION

In order to provide a better understanding of the technical solutions of the present invention to those skilled in the art, a touch panel and a display device provided by the present invention are described in detail below in conjunction with the accompanying drawings. Examples of embodiments are shown in the drawings, in which components that are same or similar or components with same or similar functions are represented by same or similar reference numerals throughout. Embodiments described by referring to the drawings below are illustrative and used only for explaining the present invention, and should not be construed as limiting the present invention.

Figure 3:
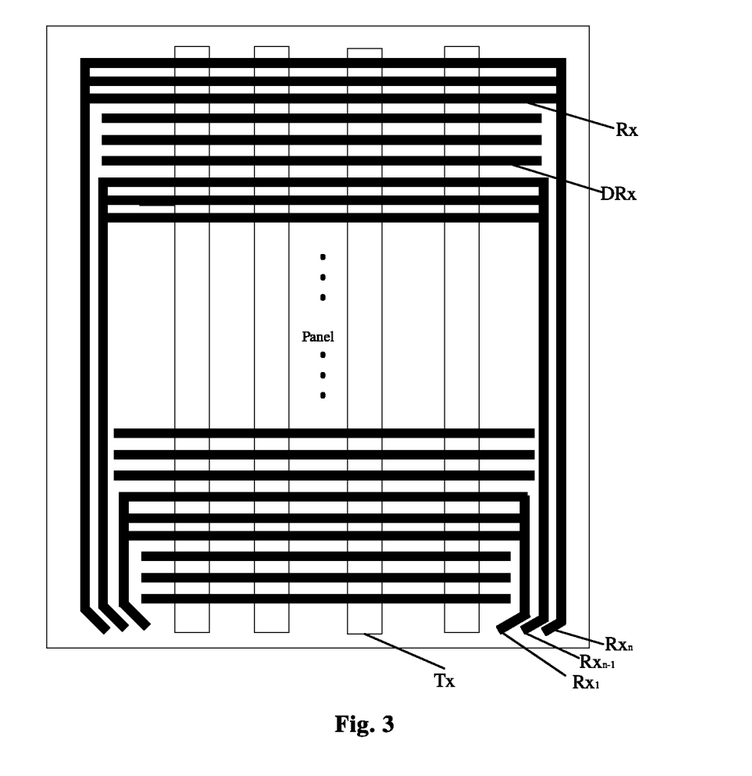
FIG. 3 is a schematic diagram of a structure of a touch panel provided by a first embodiment of the present invention.

FIG. 3 is a schematic diagram of a structure of a touch panel provided by a first embodiment of the present invention. Referring to FIG. 3, the touch panel provided by the first embodiment of the present invention includes a plurality of touch sensing electrodes Rx, a plurality of touch driving electrodes Tx, a color filter substrate CF and an array substrate TFT. The touch sensing electrodes Rx and the touch driving electrodes Tx are correspondingly formed on the color filter substrate CF and the array substrate TFT, respectively. The plurality of touch sensing electrodes Rx are arranged in parallel to each other, and arranged in a vertical direction at a non-uniform interval; the plurality of touch driving electrodes Tx are parallel to each other, and arranged in a horizontal direction at a uniform interval. Each of the touch sensing electrodes Rx and each of the touch driving electrodes Tx are arranged in the horizontal and vertical directions, respectively, i.e. the two are arranged in directions perpendicular to each other. That is, in the present embodiment, the touch sensing electrodes Rx and the touch driving electrodes Tx are arranged along different directions on different planes. In addition, an insulating layer is formed where the two cross over, and a touch-control principle of the touch panel is similar to that of the prior art, which is not described in detail herein.

A plurality of dummy electrodes Dummy Rx (hereinafter, simply referred to as "DRx") are formed on the plane where the touch sensing electrodes Rx are located, to cause electrodes on the plane where the touch sensing electrodes Rx are located to be distributed uniformly. The dummy electrode DRx refers to an electrode to which no signal is inputted and no other electrode is connected.

After intensive study on a problem, existing in the prior art, that touch sensing electrodes Rx are visible, it is discovered that because the touch sensing electrodes Rx are distributed non-uniformly on a plane where they are located, optical signals cannot experience uniform diffuse reflections on that plane, that is, there is an optical factor causing the Rx to be visible. In view of this, in the touch panel provided in the first embodiment of the present invention, uniformly-distributed electrodes can achieve uniform diffuse reflections of optical signals on the same plane, which can obviate non-uniform display frame caused by the optical factor, and improve uniformity and quality of a display frame.

Specifically, as shown in FIG. 3, each of the dummy electrodes DRx is one continuous electrode and arranged in parallel with respect to the touch sensing electrodes Rx, that is, the dummy electrodes DRx are arranged in a manner in which the touch sensing electrodes Rx are arranged, which can improve uniformity of electrodes on the plane where the touch sensing electrodes Rx are located.

Also, the plurality of the dummy electrodes DRx are arranged in a vertical direction at intervals, so that the touch sensing electrodes Rx and the dummy electrodes DRx are arranged uniformly in the vertical direction at intervals, which can further improve uniformity of distribution of the electrodes, thereby further preventing non-uniformity of a display frame.

In addition, a black matrix is formed on an inner side of the color filter substrate CF, and the touch sensing electrodes Rx and the dummy electrodes DRx are formed on an inner side of the black matrix, the inner side referring to a side facing away from a display surface. In this way, the black matrix can shade the touch sensing electrodes Rx and the dummy electrodes DRx by the black matrix, thus further preventing the two groups of electrodes from being visible, wherein the touch sensing electrodes Rx and/or the dummy electrodes DRx may be made of a metallic material or may be formed of indium tin oxide (ITO).

The touch driving electrode Tx, formed of ITO, is also used as a common electrode for display, that is, the electrode serves as a common electrode at the time of display, and serves as a touch driving electrode Tx at the time of touch-control, which can simplify a structure and a manufacturing process of a display panel, thereby reducing cost and increasing economic benefits.

It is to be noted that, although the touch sensing electrodes Rx and the dummy electrodes DRx are both provided on an inner side of the black matrix, the present invention is not limited thereto. In practical applications, the touch sensing electrodes Rx and the dummy electrodes DRx can also be provided without corresponding to the black matrix, in which case both are formed of transparent ITO so as to avoid influencing display.

It is to be further noted that, in practical applications, the touch sensing electrodes Rx and the touch driving electrodes Tx can also be provided on a same substrate, for example, both are provided on the array substrate TFT or on the color filter substrate CF. In this case, the dummy electrodes DRx are arranged in a similar manner to that described above, which is not described in detail herein.

Also, it is to be further noted that, since the touch driving electrode Tx in the present embodiment is an electrode also used as a common electrode, and the common electrode is a planar electrode, there is no need to additionally provide dummy electrodes on the plane where the touch driving electrodes Tx are located. However, in practical applications, dummy electrodes may be provided on the plane where the touch driving electrodes Tx and/or the touch sensing electrodes Rx are located according to the actual situation. For example, in a case where the touch driving electrodes Tx are not further used as a common electrode and are distributed non-uniformly on a plane, dummy electrodes can be provided as well, and at this time, the dummy electrodes may be referred to as Dummy Tx (DTx in short); and arrangement manner of the dummy electrodes DRx or DTx is not limited to the above-described manner in which the dummy electrodes DRx or DTx are parallel to the touch sensing electrodes Rx or the touch driving electrodes Tx on the plane where the dummy electrodes DRx or DTx are located, as long as the electrodes can be distributed uniformly.

Figure 4:
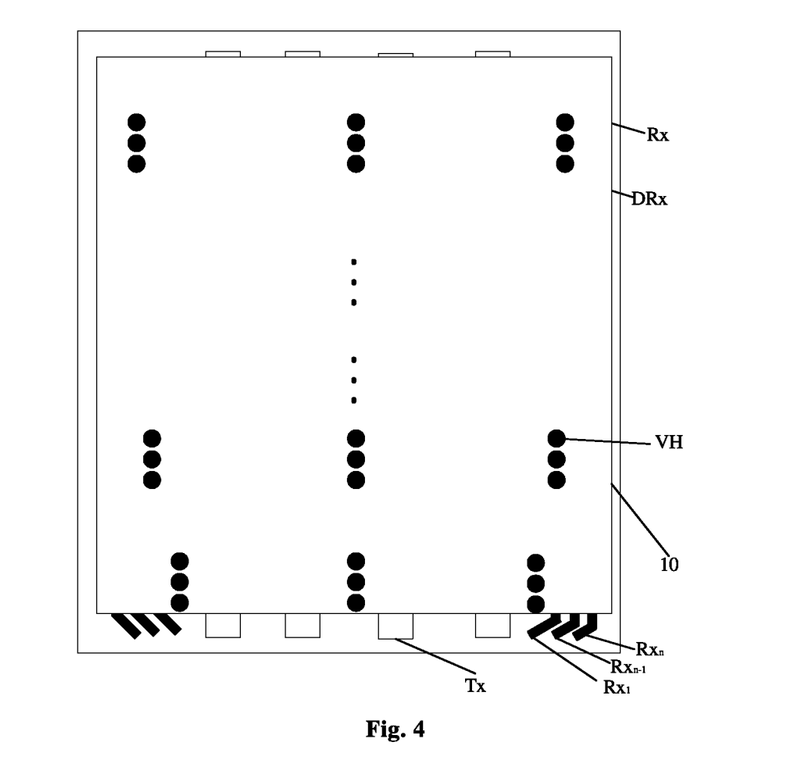
FIG. 4 is a schematic diagram of a structure of a touch panel provided by a second embodiment of the present invention.
Figure 5:
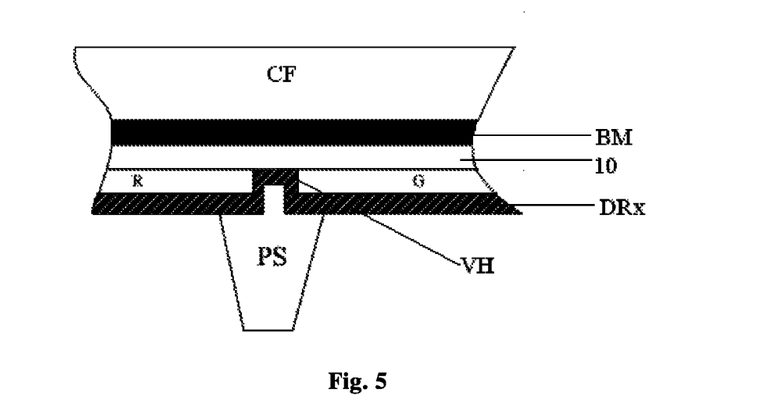
FIG. 5 is a partial cross-sectional view taken along a length direction of dummy electrodes on the touch panel illustrated in FIG. 4.

FIG. 4 is a schematic diagram of a structure of a touch panel provided by a second embodiment of the present invention; FIG. 5 is a partial cross-sectional view taken along a length direction of dummy electrodes on the touch panel illustrated in FIG. 4. Referring to FIG. 4 together with FIG. 5, the touch panel provided by the present embodiment is similar to the touch panel provided by the first embodiment described above, including touch driving electrodes Tx, dummy electrodes DRx, touch sensing electrodes Rx, a color filter substrate CF and an array substrate TFT as well. Since positional relationships among and functions of the touch driving electrodes Tx, the dummy electrodes DRx, the touch sensing electrodes Rx, the color filter substrate CF and the array substrate TFT have already been described in detail in the first embodiment above, the description thereof is not repeated herein.

Only differences of the present embodiment from the first embodiment above are described in detail below. Specifically, since there is a coupling between the dummy electrodes DRx and the touch driving electrodes Tx of the touch panel shown in FIG. 3, electric charges may be present on the dummy electrodes DRx, which results in inconsistency between a deflection of liquid crystals at a position corresponding to the dummy electrode DRx and a deflection of liquid crystals at a position corresponding to other region during display, thereby causing the dummy electrodes DRx to be visible, resulting in a non-uniform display frame. To this end, in the present embodiment, each dummy electrode DRx is connected to the ground.

Specifically, one or more via holes Via Hole (hereinafter, simply referred to as "VH") are provided in each dummy electrode DRx, and a grounded high resistance film layer 10 is formed on an outer side of the plane on which the dummy electrodes DRx are located. Each of the dummy electrodes DRx is electrically connected to the high resistance film layer 10 via the via holes VH, and the outer side of the plane on which the dummy electrodes DRx are located refers to a side facing towards the display surface. By grounding the dummy electrodes DRx via the high resistance film layer 10, electric charges generated on the dummy electrodes DRx due to coupling can be removed, and thus the above-described problem that the dummy electrodes DRx are visible can be solved.

As shown in FIG. 5, the high resistance film layer 10 is formed between the black matrix BM and the color filter (R, G and B), and the via holes VH penetrate the color filter to be connected with the high resistance film layer 10. In practical applications, the high resistance film layer 10 can also be provided between the color filter substrate CF and the black matrix BM, with the via holes VH penetrating the black matrix to be connected with the high resistance film layer 10.

Preferably, a plurality of via holes VH are arranged uniformly at intervals along a length direction of the dummy electrode DRx, which can achieve a quick release of the electric charges on the dummy electrodes DRx, thereby improving the quality of the display frame of the touch panel. In the present embodiment, as shown in FIG. 4, there are 3 via holes, provided at both ends and a central position of each dummy electrode DRx respectively.

It is to be noted that, in practical applications, for the above-described dummy electrodes DRx, other methods can also be employed to remove electric charges thereon, for example, the dummy electrodes DRx are electrically connected to a lead wire, which is electrically connected to the ground.

Figure 6:
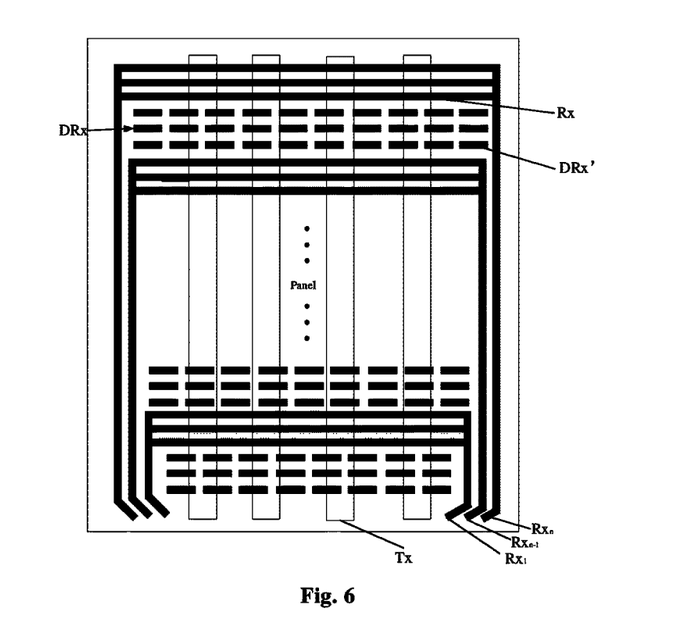
FIG. 6 is a schematic diagram of a first structure of a touch panel provided by a third embodiment of the present invention.

FIG. 6 is a schematic diagram of a first structure of a touch panel provided by a third embodiment of the present invention. Referring to FIG. 6, the touch panel provided by the present embodiment is similar to the touch panel provided by the first embodiment described above, and includes touch driving electrodes Tx, dummy electrodes DRx, touch sensing electrodes Rx, a color filter substrate CF and an array substrate TFT as well. Since positional relationships among and functions of the touch driving electrodes Tx, the dummy electrodes DRx, the touch sensing electrodes Rx, the color filter substrate CF and the array substrate TFT have already been described in detail in the first embodiment above, the description thereof is not repeated herein.

Only differences of the present embodiment from the first embodiment above are described in detail below. Specifically, in the present embodiment, each dummy electrode DRx may further include a plurality of dummy sub-electrodes DRx' spaced apart from each other, which, compared to the continuous dummy electrode DRx shown in FIG. 3, may not only facilitate, to a certain extent, uniform distribution of the electrodes on the plane where the touch sensing electrodes Rx are located, but also reduce influence of a crosstalk resulting from that multiple touch driving electrodes Tx pass through one continuous dummy electrode DRx which crosses over the multiple touch driving electrodes Tx, and thus, white noise can be reduced, thereby preventing the display from being influenced.

Preferably, each dummy electrode DRx includes a plurality of dummy sub-electrodes DRx' uniformly distributed at intervals, that is, the plurality of dummy sub-electrodes DRx' are arranged uniformly at intervals along a length direction of the dummy electrodes DRx, which can further increase uniformity of distribution of electrodes on the plane where the touch sensing electrodes Rx are located.

Further preferably, each dummy sub-electrode DRx' crosses over only one touch driving electrode Tx, which can absolutely prevent crosstalk from occurring among the plurality of touch driving electrodes Tx.

Figure 7:
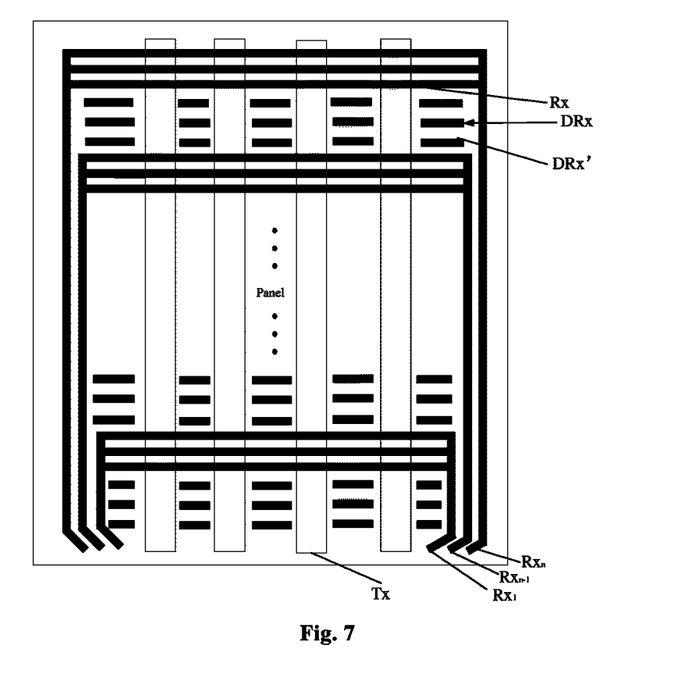
FIG. 7 is a schematic diagram of a second structure of a touch panel provided by a third embodiment of the present invention.

Also, preferably, as shown in FIG. 7, each dummy sub-electrode DRx' is provided on a corresponding region between two adjacent touch driving electrodes Tx, in this case, each dummy sub-electrode DRx' does not cross over the touch driving electrodes Tx, and thus not only can crosstalk be prevented from occurring, but also coupling between each dummy electrode DRx and the touch driving electrode Tx can be reduced or even eliminated.

Figure 8:
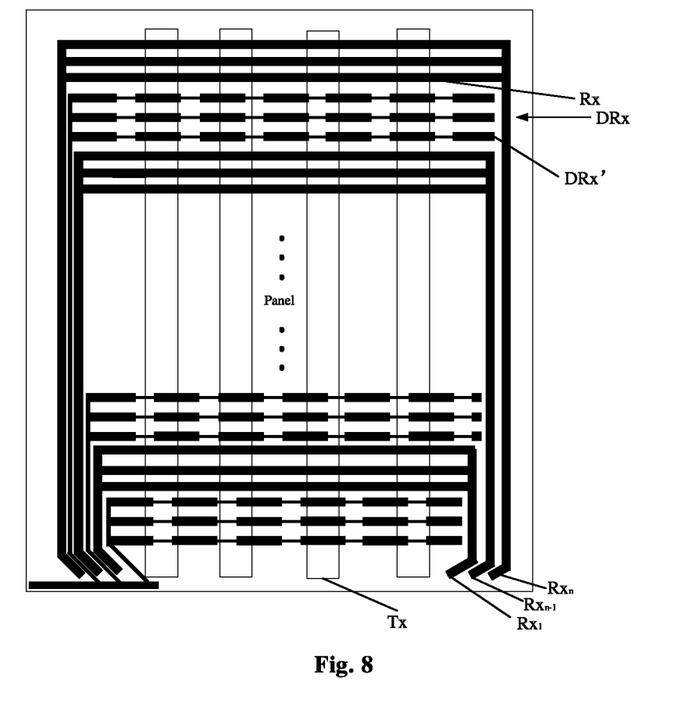
FIG. 8 is a schematic diagram of a structure of a touch panel provided by a fourth embodiment of the present invention.

FIG. 8 is a schematic diagram of a structure of a touch panel provided by a fourth embodiment of the present invention. Referring to FIG. 8, the touch panel provided by the present embodiment is similar to the touch panel provided by the third embodiment, and includes touch driving electrodes Tx, dummy electrodes DRx, touch sensing electrodes Rx, a color filter substrate CF and an array substrate TFT as well. Since positional relationships between among and functions of the touch driving electrodes Tx, the dummy electrodes DRx, the touch sensing electrodes Rx, the color filter substrate CF and the array substrate TFT have already been described in detail in the third embodiment above, the description thereof is not repeated herein.

Only differences of the present embodiment from the third embodiment above are described in detail below. Specifically, since there is coupling between the dummy sub-electrodes DRx' and the touch driving electrodes Tx of the touch panel shown in FIG. 6, electric charges may be present on the dummy sub-electrodes DRx', which results in inconsistency between a deflection of liquid crystals LC at a position corresponding to the dummy sub-electrode DRx' and a deflection of liquid crystals LC at a position corresponding to other region during display, thereby causing the dummy sub-electrodes DRx' to be visible, and resulting in a non-uniform display frame. To this end, in the present embodiment, all of the dummy sub-electrodes DRx' are electrically connected and grounded using thin wires. This can not only remove electric charges generated on the dummy sub-electrodes DRx' due to coupling, thus solving the above-described problem of the dummy sub-electrodes DRx' being visible; but also reduce crosstalk among the plurality of touch driving electrodes Tx to a significant extent, because the thinner the wires, the larger the impedance, which causes a discharge circuit to be at a high impedance state.

In the present embodiment, as shown in FIG. 8, multiple dummy sub-electrodes DRx' of a same dummy electrode DRx are successively connected in series, and then connected to the ground by a peripheral lead wire. However, the present invention is not limited thereto, and in practical applications, connection manner of all of the dummy sub-electrodes DRx' is not limited, as long as grounding can be achieved for all of the dummy sub-electrodes DRx'.

It is to be noted that, in practical applications, if there is coupling between the dummy sub-electrodes DRx' and the touch driving electrodes Tx in FIG. 7 and electric charges are generated, the touch panel shown in FIG. 7 can as well be modified likewise, that is, all of the dummy sub-electrodes DRx' of FIG. 7 can be electrically connected and grounded by thin wires.

Figure 9:
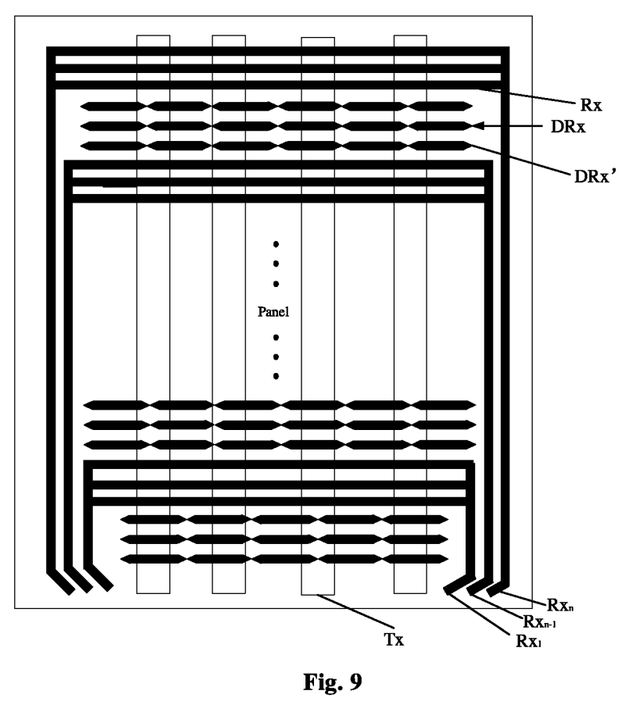
FIG. 9 is a schematic diagram of a structure of a touch panel provided by a fifth embodiment of the present invention.

FIG. 9 is a schematic diagram of a structure of a touch panel provided by a fifth embodiment of the present invention. Referring to FIG. 9, the touch panel provided by the present embodiment is similar to the touch panel provided by the fourth embodiment described above, and includes touch driving electrodes Tx, dummy electrodes DRx, touch sensing electrodes Rx, a color filter substrate CF and an array substrate TFT as well. Since positional relationships among and functions of the touch driving electrodes Tx, the dummy electrodes DRx, the touch sensing electrodes Rx, the color filter substrate CF and the array substrate TFT have already been described in detail in the four embodiment above, the description thereof is not repeated herein.

Only differences of the present embodiment from the fourth embodiment above are described in detail below. Specifically, in the present embodiment, a tip is formed at both ends of each dummy sub-electrode DRx' of each dummy electrode DRx, and two adjacent tips are in contact with each other. In this case, tip discharge can achieve releasing charges of the dummy sub-electrodes DRx', and because the dummy sub-electrodes DRx' are connected via the tips, there is a high impedance therebetween, and therefore crosstalk among the plurality of touch driving electrodes Tx can be reduced to a significant extent. In addition, compared to the touch panel provided by the fourth embodiment, in the present embodiment, external grounding of peripheral lead wires is not required, thereby reducing a process structure and simplifying a process flow.

As another technical solution, an embodiment of the present invention further provides a display device, including a touch panel, and the touch panel may be any one of the touch panels provided by the above first to fifth embodiments of the present invention.

The display device provided by an embodiment of the present invention, since it employs the touch panel provided by an embodiment of the present invention, can improve uniformity of a display frame, thereby improving a quality of the display frame.

It can be understood that the foregoing implementations are merely exemplary implementations used for describing the principle of the present invention, but the present invention is not limited thereto. Those of ordinary skill in the art may make various variations and modifications without departing from the spirit and essence of the present invention, and these variations and modifications shall fall into the protection scope of the present invention.

The invention claimed is:

1. A touch panel, comprising a plurality of touch sensing electrodes and a plurality of touch driving electrodes, wherein the touch sensing electrodes and the touch driving electrodes are arranged along different directions on different planes, with an insulating layer provided where the touch sensing electrodes and the touch driving electrodes cross over; and a plurality of dummy electrodes are formed on a plane where the touch sensing electrodes and/or the touch driving electrodes are located, so that electrodes on a same plane are distributed uniformly; wherein each of the dummy electrodes is one continuous electrode, each of the dummy electrodes is connected to the ground, one or more via holes are provided in each of the dummy electrodes, a grounded high resistance film layer is formed on an outer side of a plane on which the dummy electrodes are located, and each of the dummy electrodes is electrically connected to the high resistance film layer via the via holes.

2. The touch panel according to claim 1, wherein the one or more via holes are spaced apart uniformly from each other along a length direction of the dummy electrodes.

3. The touch panel according to claim 2, further comprising a color filter substrate and an array substrate, wherein the touch sensing electrodes are provided on the color filter substrate, the touch driving electrodes are provided on the array substrate, and the dummy electrodes are provided on the plane on which the touch sensing electrodes are located.

4. The touch panel according to claim 1, wherein the plurality of the touch driving electrodes or the plurality of touch sensing electrodes are arranged in parallel to each other; and each of the dummy electrodes is arranged in parallel to the touch sensing electrodes or the touch driving electrodes on the plane where the dummy electrode is located.

5. The touch panel according to claim 1, further comprising a color filter substrate and an array substrate, wherein the touch sensing electrodes are provided on the color filter substrate, the touch driving electrodes are provided on the array substrate, and the dummy electrodes are provided on the plane on which the touch sensing electrodes are located.

6. The touch panel according to claim 5, wherein a black matrix is formed on an inner side of the color filter substrate, and the touch sensing electrodes and the dummy electrodes are formed on an inner side of the black matrix, the inner side being a side facing away from a display surface.

7. A display device, comprising a touch panel, wherein the touch panel is the touch panel according to claim 1.

* * * * *